US 6,649,667 B2

(12) United States Patent
Clatty

(10) Patent No.: US 6,649,667 B2
(45) Date of Patent: Nov. 18, 2003

(54) POLYURETHANE FOAMS HAVING IMPROVED HEAT SAG AND A PROCESS FOR THEIR PRODUCTION

(75) Inventor: Jan L. Clatty, Moon Township, PA (US)

(73) Assignee: Bayer Polymers LLC, Pittsburgh, PA (US)

( * ) Notice: Subject to any disclaimer, the term of this patent is extended or adjusted under 35 U.S.C. 154(b) by 0 days.

(21) Appl. No.: 10/336,111

(22) Filed: Mar. 4, 2003

(65) Prior Publication Data

US 2003/0166735 A1 Sep. 4, 2003

Related U.S. Application Data

(62) Division of application No. 09/876,778, filed on Jun. 7, 2001.

(51) Int. Cl.[7] .............................................. C08G 18/10
(52) U.S. Cl. .................... 521/170; 521/109.1; 521/151; 521/155
(58) Field of Search ............................. 521/109.1, 151, 521/155, 170

(56) References Cited

U.S. PATENT DOCUMENTS

| 2,787,601 A | 4/1957 | Detrick et al. | |
|---|---|---|---|
| 2,833,730 A | 5/1958 | Barthel, Jr. | |
| 4,742,087 A | 5/1988 | Kluth et al. | 521/107 |
| 5,026,739 A | 6/1991 | Matsushima et al. | 521/177 |
| 5,225,453 A | 7/1993 | Yamamori | 521/137 |
| 5,482,980 A | 1/1996 | Pcolinsky | 521/130 |
| 5,750,583 A | 5/1998 | Gansen et al. | 521/78 |
| 5,837,172 A | 11/1998 | Pritchard et al. | |
| 5,886,062 A | 3/1999 | Dietrich et al. | 521/167 |
| 6,005,016 A | 12/1999 | Nodelman et al. | 521/164 |
| 6,180,686 B1 | 1/2001 | Kurth | 521/51 |
| 2001/0003122 A1 | 6/2001 | Scherzer et al. | 521/137 |

FOREIGN PATENT DOCUMENTS

| EP | 0 803 523 | 10/1997 |
|---|---|---|
| EP | 1 162 222 | 12/2001 |
| WO | 00/23491 | 4/2000 |

OTHER PUBLICATIONS

Oertel, Polyurethane Handbook, 2nd edition (month unavailable) 1994, Section 7.4, pp. 368–385, Rigid Integral Skin Foams and RIM Materials, Dr. G. Avar, Dr. U. Knipp and Dr. H. Müller.

Chemical Abstracts, vol. 101, No. 10, Sep. 1984 Columbus, Ohio, US; abstract No. 73755p, "Rigid polyrethane foams" p. 46; col. 2; XP002211620 abstract & JP 05 962617 A (Dainippon Ink and Chemicals) Apr. 10, 1984.

Primary Examiner—John M. Cooney, Jr.
(74) Attorney, Agent, or Firm—Joseph C. Gil; Lyndanne M. Whalen

(57) ABSTRACT

Rigid, closed-cell polyurethane foams are produced by a RIM process by reacting an organic polyisocyanate with an isocyanate-reactive mixture in which a significant amount of a bio-based polyol is present. The foams produced by this process are characterized by improved heat sag and heat distortion temperature.

10 Claims, 6 Drawing Sheets

POLYURETHANE FOAMS HAVING IMPROVED HEAT SAG AND A PROCESS FOR THEIR PRODUCTION

This application is a Divisional of Ser. No. 09/876,778 filed Jun. 7, 2001.

BACKGROUND OF THE INVENTION

The present invention relates to polyurethane foams having a closed cell content of at least 90% and improved heat sag properties produced by reaction injection molding ("RIM") and to a process for the production of such foams.

RIM processes for the production of polyurethane foams are well known. See, for example, Oertel, *Polyurethane Handbook*, 2d Ed., ©1994, Section 7.4, pages 368–385 and U.S. Pat. Nos. 5,026,739; 5,225,453; 5,837,172; and 6,005,016.

In these known processes, an organic diisocyanate or polyisocyanate is reacted with an isocyanate-reactive component that includes at least one (generally more than one) polyol, a catalyst, a cross-linking agent and other processing aids. The polyols used are those which are typically derived from sources such as sucrose, amines, glycerine, ethylene glycol, etc. Many of these starting materials are derived from increasingly expensive petrochemicals. It would therefore be advantageous to substitute some or all of these polyols with polyols derived from less expensive starting materials.

Alternative sources for such polyols which have been proposed are renewable sources such as vegetable oils (e.g., soybean oil, castor oil, linseed oil, tung oil, peanut oil, sunflower oil) and fish oils.

U.S. Pat. No. 2,787,601, for example, discloses cellular, flexible polyurethanes made with hydroxyl-group containing fatty acid glycerides. More specifically, a simple (i.e., unmodified) and untreated hydroxyl-group containing fatty acid glyceride such as castor oil is reacted with an aromatic diisocyanate to form an isocyanate-terminated prepolymer. This prepolymer is then reacted with water to form a cellular foam having reported apparent densities of from 2.8 to 6.5 pounds per cubic foot.

U.S. Pat. No. 2,833,730 also discloses cellular polyurethanes produced from a polyol based on a fatty acid triglyceride which reportedly do not have the shrinkage problems encountered with similar, prior art polyurethanes made from such polyols. More specifically, a mixture of a low molecular weight polyhydroxyl compound and a hydroxyl group-containing triglyceride (unmodified and untreated) is reacted with an aromatic diisocyanate to form an isocyanate-terminated prepolymer. This prepolymer is then reacted with water to form the desired polyurethane product. The ratio of the low molecular weight polyhydroxyl compound to the hydroxyl-group containing triglyceride should be at least 0.6 to 1 in order to obtain a polyurethane having the improved shrinkage property.

Unmodified vegetable oils have not, however, been used as a major reaction component to produce rigid polyurethane foams by a RIM process.

Use of unmodified vegetable oils as a major substituent of a polyol component used to produce rigid polyurethane foams is, however, disadvantageous because the unmodified vegetable oil tends to migrate to the polyurethane surface over time and thereby increase the potential for problems after a molded part is painted and reduction of physical properties.

In an effort to improve the physical properties of foams produced from vegetable oils, those vegetable oils have been chemically modified prior to use. U.S. Pat. No. 4,742,087, for example, discloses a process in which the epoxidized oils are partially converted by alcoholysis or transesterification to alkyl ester polyols which are used to produce isocyanate-terminated prepolymers. These prepolymers are subsequently reacted to produce polyurethane foams.

U.S. Pat. No. 5,482,980 discloses a process for the production of flexible open-celled, urethane foams in which epoxidized soybean oil is included in the polyether polyol reaction component.

Epoxidized vegetable oils have also been used in relatively minor amounts in polyurethane-forming reaction mixtures as emulsifiers. See, e.g., U.S. Pat. No. 5,750,583.

Such chemically modified oils have not, however, been used as a significant portion of the polyol component used to produce rigid, closed-cell polyurethane foams because at higher levels these types of materials would be expected to function in the same manner as internal mold release agents and increase the potential for de-lamination when molding composite articles.

The use of modified vegetable oils is also commercially disadvantageous due to the energy, materials and time required for epoxidation and any subsequent conversion, e.g., to a polyester polyol.

One alternative to such chemically modified vegetable oils is disclosed in U.S. Pat. No. 6,180,686. In this patent, urethane foams and elastomers are produced by reacting an isocyanate with a vegetable oil which has been treated by passing air through the oil to remove impurities and thicken the oil (referred to as "blown oil") in the presence of a multi-functional alcohol crosslinking agent such as butanediol or ethylene glycol. The blown oil is used as the sole isocyanate-reactive component. No petroleum-based polyester or polyether polyol is included. Rigid, closed-celled polyurethane foams are not, however, taught to be producible with the disclosed blown vegetable oils.

It would therefore be advantageous to develop a process in which rigid, closed cell, polyurethane foams may be produced by a RIM process using as a polyol component an unmodified renewable source such as a vegetable oil without sacrificing the physical properties of that rigid foam.

SUMMARY OF THE INVENTION

It is an object of the present invention to provide a polyol component useful in the production of rigid, closed-cell polyurethane foams which polyol component includes a bio-based polyol material as a significant component.

It is also an object of the present invention to provide a RIM process for the production of rigid, closed-cell polyurethane foams having good physical properties from a reaction mixture which includes a significant amount of a bio-based polyol material.

These and other objects which will be apparent to those skilled in the art are accomplished by including up to 30% by weight, based on total weight of isocyanate-reactive component, of a blown bio-based oil (also referred to herein as a "bio-based polyol" or "blown vegetable oil" or a "polymerized vegetable oil") such as soybean oil in an isocyanate-reactive component to be used in a RIM process.

Figure 2:
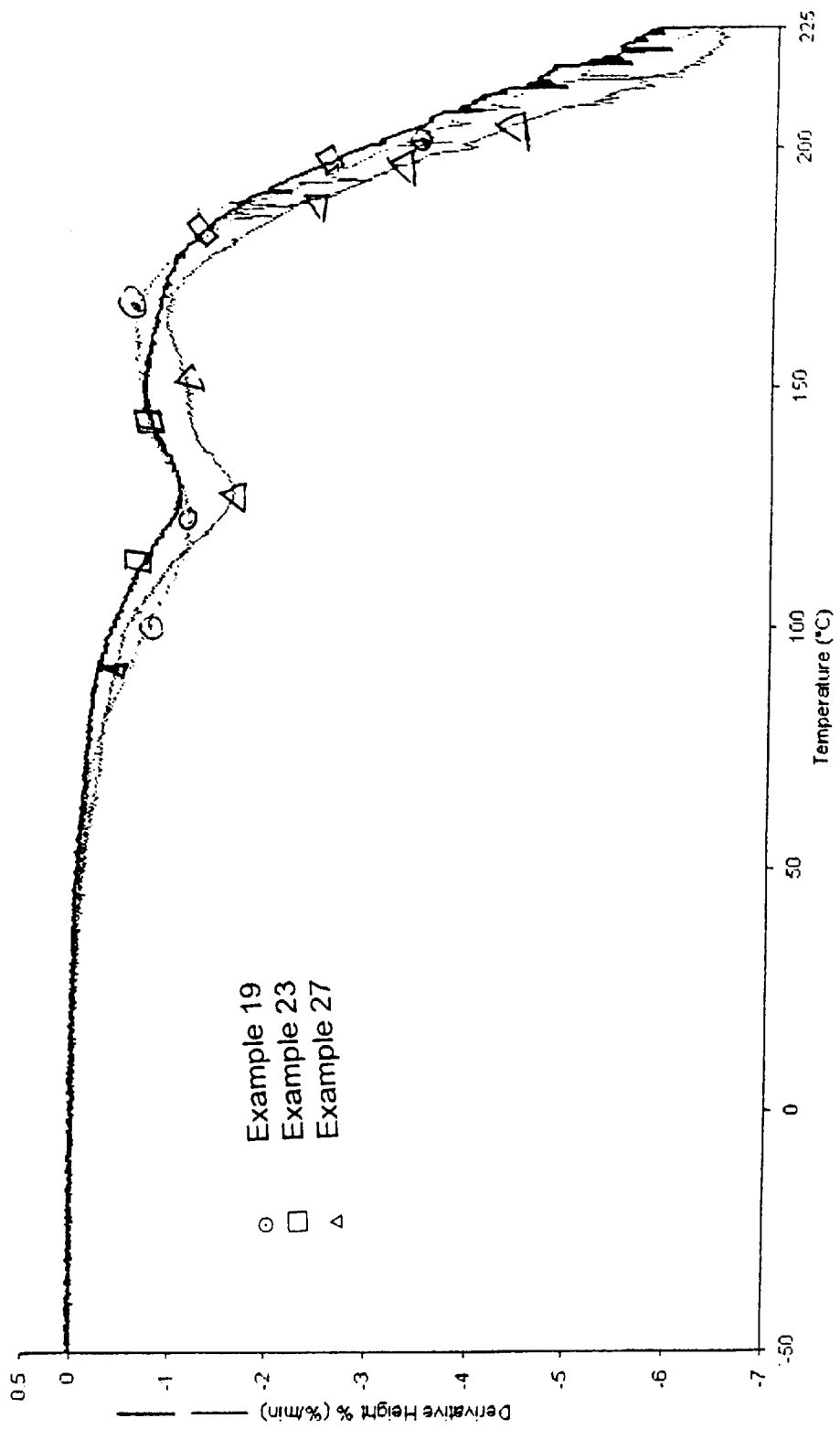

FIG. 2 is a graph on which the derivative of the % penetration of a probe is plotted against temperature for molded articles produced in accordance with each of Examples 31, 35 and 39.

Figure 3:
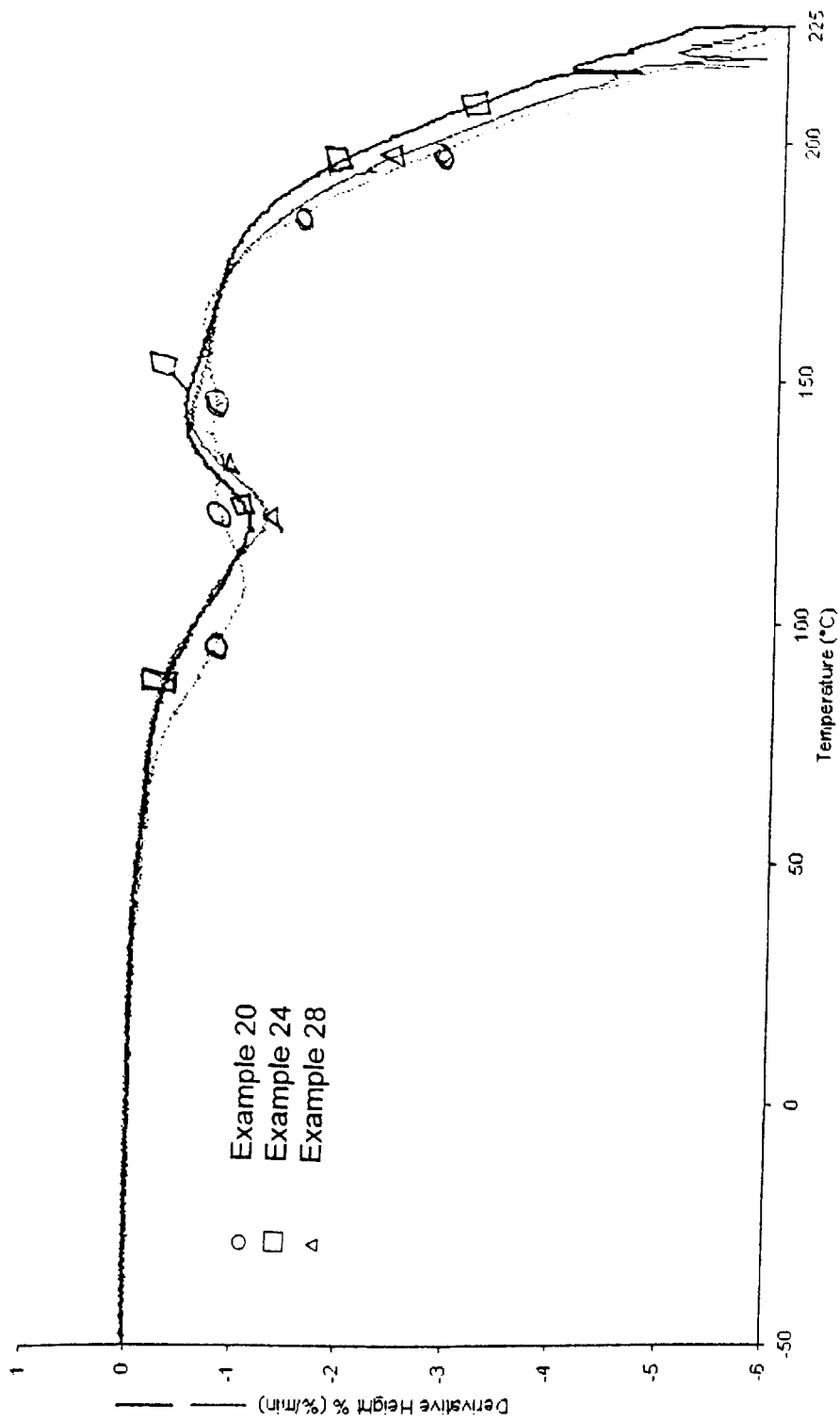

FIG. 3 is a graph on which the derivative of the % penetration of a probe is plotted against temperature for molded articles produced in accordance with each of Examples 32, 36 and 40.

Figure 4:
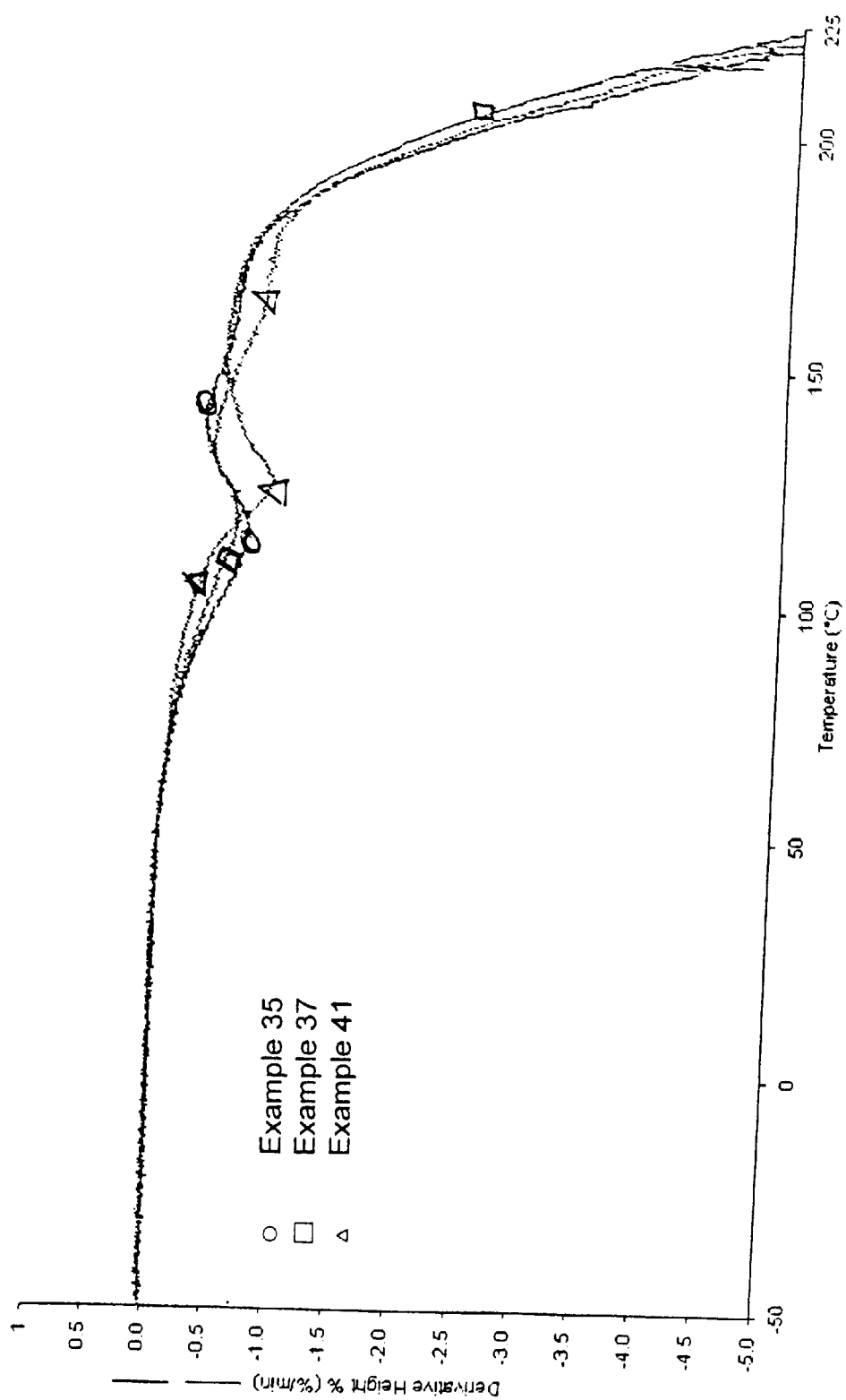

FIG. 4 is a graph on which the derivative of the % penetration of a probe is plotted against temperature for molded articles produced in accordance with each of Examples 33, 37 and 41.

Figure 5:
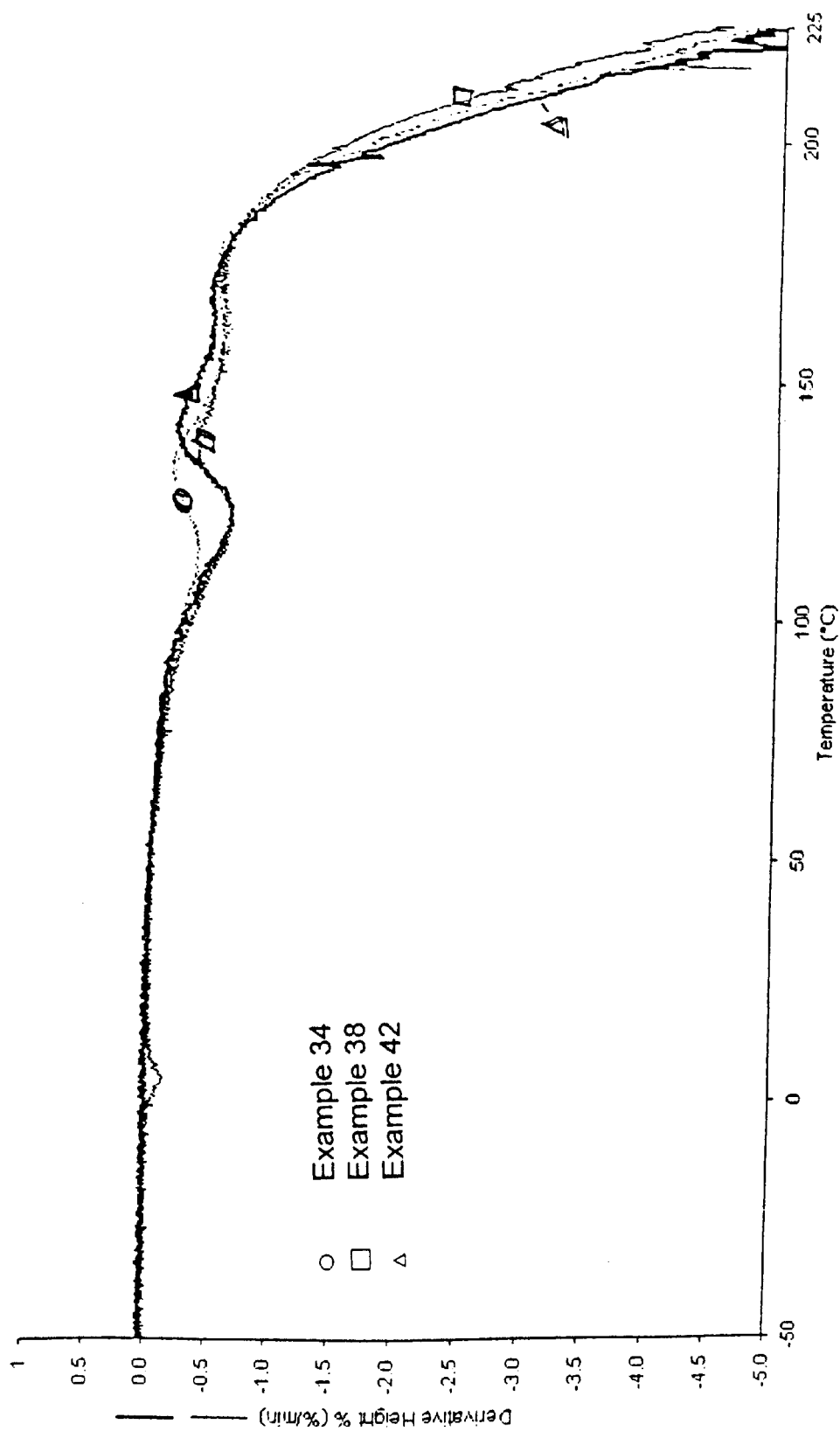

FIG. 5 is a graph on which the derivative of the % penetration of a probe is plotted against temperature for molded articles produced in accordance with each of Examples 34, 38 and 42.

Figure 6:
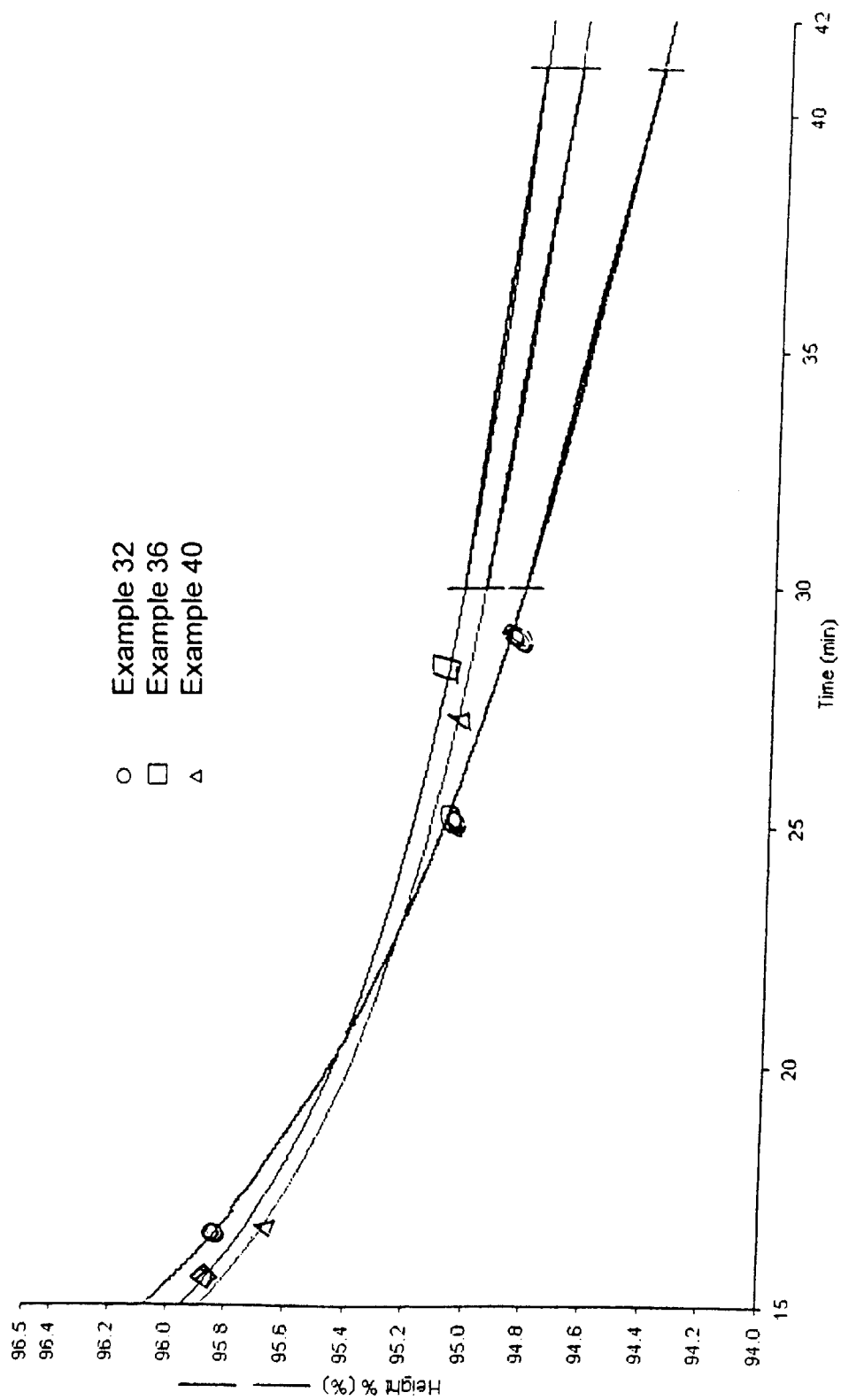

FIG. 6 is a graph on which the % penetration of a probe is plotted against time for molded articles produced in accordance with each of Examples 32, 36 and 40 at a constant temperature.

DETAILED DESCRIPTION OF THE PREFERRED EMBODIMENTS OF THE PRESENT INVENTION

The present invention relates to a RIM process for the production of rigid, closed-cell polyurethane foams and particularly to the use of an isocyanate-reactive component in which up to 30% by weight is a blown bio-based oil such as soybean oil. The invention also relates to the rigid, closed cell polyurethane foams produced by this process.

A key feature of the present invention is the use of a blown vegetable oil in the isocyanate-reactive component in an amount of from about 0.5 to 30% by weight, preferably from about 5 to 25% by weight, most preferably from about 10 to 20% by weight, based on total weight of isocyanate-reactive component. Any of the known bio-based oils, particularly vegetable oils, through which air has been passed to remove impurities and to thicken the oil may be used in the practice of the present invention. Examples of suitable bio-based oils which may be used in the present invention after being blown include: vegetable oils such as soybean oil, rapeseed or canola oil, peanut oil, cottonseed oil, olive oil, grapeseed oil, coconut oil, palm oil, linseed oil, and castor oil; fish oils and oils derived from animal fats. Soybean oil and castor oil are preferred. Soybean oil is particularly preferred. Such blown oils are described in U.S. Pat. No. 6,180,686 and are commercially available from Urethane Soy Systems under the names SoyOyl P38.GC5 bio-based polyol and SoyOyl P38-05 bio-based polyol and SoyOyl P56.05 bio-based polyol.

The other constituents of the isocyanate-reactive component useful in combination with the required blown vegetable oil include any of the known isocyanate-reactive materials, chain extenders, cross-linking agents, catalysts, foaming agents, additives and processing aids commonly used in RIM processes.

Suitable isocyanate-reactive compounds useful in combination with the required blown vegetable oil include compounds having a number average molecular weight of from 400 to about 10,000, preferably from about 470 to about 8,000, most preferably from about 1,000 to about 6,000 and contain amino groups, hydroxyl groups, thiol groups, or a combination thereof. These isocyanate-reactive compounds generally contain from about 1 to about 8 isocyanate-reactive groups, preferably from about 2 to about 6 isocyanate-reactive groups. Suitable such compounds include polyethers, polyesters, polyacetals, polycarbonates, polyesterethers, polyester carbonates, polythioethers, polyamides, polyesteramides, polysiloxanes, polybutadienes, and polyacetones. Particularly preferred isocyanate-reactive compounds contain 2 to 4 reactive amino or hydroxyl groups.

These isocyanate-reactive compounds are generally included in the isocyanate-reactive component in an amount of from about 5 to about 80% by weight (based on total weight of isocyanate-reactive component), preferably from about 5 to about 60% by weight, most preferably from about 10 to about 50% by weight.

Suitable hydroxyl-containing polyethers are known and commercially available. Such polyether polyols can be prepared, for example, by the polymerization of epoxides such as ethylene oxide, propylene oxide, butylene oxide, tetrahydrofuran, styrene oxide, or epichlorohydrin, optionally in the presence of $BF_3$, or by chemical addition of such epoxides, optionally as mixtures or successively, to starting components containing reactive hydrogen atoms, such as water, alcohols, or amines. Examples of such starting components include ethylene glycol, 1,2- or 1,3-propanediol, 1,2-, 1,3-, or 1,4-butanediol, glycerin, trimethylolpropane, pentaerythritol, 4,4'-dihydroxydiphenylpropane, aniline, 2,4- or 2,6-diaminotoluene, ammonia, ethanolamine, triethanolamine, or ethylene diamine. Sucrose polyethers may also be used. Polyethers that contain predominantly primary hydroxyl groups (up to about 90% by weight, based on all of the hydroxyl groups in the polyether) are preferred. Polyethers modified by vinyl polymers of the kind obtained, for example, by the polymerization of styrene and acrylonitrile in the presence of polyethers are also suitable, as are polybutadienes containing hydroxyl groups. Particularly preferred polyethers include polyoxyalkylene polyether polyols, such as polyoxyethylene diol, polyoxypropylene diol, polyoxybutylene diol, and polytetramethylene diol.

Hydroxyl-containing polyesters are also suitable for use in the isocyanate-reactive component. Suitable hydroxyl-containing polyesters include reaction products of polyhydric alcohols (preferably diols), optionally with the addition of trihydric alcohols, and polybasic (preferably dibasic) carboxylic acids. Instead of free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic, or heterocyclic and may be substituted, e.g., by halogen atoms, and/or unsaturated. Suitable polycarboxylic acids include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, dimethyl terephthalic, and terephthalic acid bis-glycol esters. Suitable polyhydric alcohols include ethylene glycol, 1,2- and 1,3-propanediol, 1,4- and 2,3-butanediol, 1,6-hexanediol, 1,8-octanediol, neopentyl glycol, 1,3- and 1,4-bis(hydroxy-methyl)cyclohexane, 2-methyl-1,3-propanediol, glycerol, trimethylolpropane, 1,2,6-hexanetriol, 1,2,4-butanetriol, trimethylolethane, pentaerythritol, quinnitol, mannitol, sorbitol, methyl glycoside, diethylene glycol, triethylene glycol, tetraethylene glycol, polyethylene glycols, dipropylene glycol, polypropylene glycols, dibutylene glycol, and poly-butylene glycols. The polyesters may also contain a proportion of carboxyl end groups. Polyesters of lactones, such as ε-caprolactone, or of hydroxycarboxylic acids, such as ω-hydroxycaproic acid, may also be used. Hydrolytically stable polyesters are preferably used in order to obtain the greatest benefit relative to the hydrolytic stability of the final product. Preferred polyesters include polyesters obtained from adipic acid or isophthalic acid and straight chained or branched diols, as well as lactone polyesters, preferably those based on caprolactone and diols.

Suitable polyacetals include compounds obtained from the condensation of glycols, such as diethylene glycol, triethylene glycol, 4,4'-dihydroxydiphenylmethane, and hexanediol, with formaldehyde or by the polymerization of cyclic acetals, such as trioxane.

Suitable polycarbonates include those prepared by the reaction of diols, such as 1,3-propanediol, 1,4-butanediol, 1,6-hexanediol, diethylene glycol, triethylene glycol, tetraethylene glycol, or thiodiglycol, with phosgene or diaryl carbonates such as diphenyl carbonate.

Suitable polyester carbonates include those prepared by the reaction of polyester diols, with or without other diols such as 1,3-propanediol, 1,4-butanediol, 1,6-hexanediol, diethylene glycol, triethylene glycol, tetraethylene glycol, or thiodiglycol, with phosgene, cyclic carbonates, or diaryl carbonates such as diphenyl carbonate. Suitable polyester carbonates more generally include compounds such as those disclosed in U.S. Pat. No. 4,430,484.

Suitable polythioethers include the condensation products obtained by the reaction of thiodiglycol, either alone or with other glycols, formaldehyde, or amino alcohols. The products obtained are polythio-mixed ethers, polythioether esters, or polythioether ester amides, depending on the components used.

Suitable polyester amides and polyamides include, for example, the predominantly linear condensates prepared from polybasic saturated and unsaturated carboxylic acids or the anhydrides thereof and polyvalent saturated or unsaturated amino alcohols, diamines, polyamines, and mixtures thereof.

Although less preferred, other suitable hydroxyl-containing compounds include polyhydroxyl compounds already containing urethane or urea groups. Products of addition of alkylene oxides to phenol-formaldehyde resins or to urea-formaldehyde resins are also suitable.

Polyhydroxyl compounds in which polyadducts or polycondensates or polymers are present in a finely dispersed or dissolved form may also be used according to the invention, provided that the molecular weights range from about 400 to about 10,000. Polyhydroxyl compounds of this type may be obtained, for example, by carrying out polyaddition reactions (e.g., reactions between polyisocyanates and amino functional compounds) or polycondensation reactions (e.g., between formaldehyde and phenols or amines) in situ in the above-mentioned hydroxyl-containing compounds. Suitable compounds may also be obtained according to U.S. Pat. Nos. 3,869,413 or 2,550,860 by mixing a previously prepared aqueous polymer dispersion with a polyhydroxyl compound and then removing water from the mixture.

Polyhydroxyl compounds modified with vinyl polymers, such as those obtained, for example, by the polymerization of styrene and acrylonitrile in the presence of polycarbonate polyols (U.S. Pat. No. 3,637,909) are also suitable for the process of the invention.

General discussions of representative hydroxyl-containing compounds that may be used according to the present invention can be found, for example, in *Polyurethanes, Chemistry and Technology* by Saunders and Frisch, Interscience Publishers, New York, London, Volume I, 1962, pages 32–42 and pages 44–54, and Volume II, 1964, pages 5–6 and 198–199, and in *Kunststoff-Handbuch*, Volume VII, Vieweg-Höchtlen, Carl-Hanser-Verlag, Munich, 1966, on pages 45 to 71.

Suitable isocyanate-reactive compounds containing amino groups include the so-called amine-terminated polyethers containing primary or secondary (preferably primary) aromatically or aliphatically (preferably aliphatically) bound amino groups. Compounds containing amino end groups can also be attached to the polyether chain through urethane or ester groups. These amine-terminated polyethers can be prepared by any of several methods known in the art. For example, amine-terminated polyethers can be prepared from polyhydroxyl polyethers (e.g., polypropylene glycol ethers) by a reaction with ammonia in the presence of Raney nickel and hydrogen. Polyoxyalkylene polyamines can be prepared by a reaction of the corresponding polyol with ammonia and hydrogen in the presence of a nickel, copper, chromium catalyst. Polyethers containing amino end groups may be prepared by hydrogenation of cyanoethylated polyoxypropylene ethers.

Relatively high molecular weight polyhydroxy-polyethers suitable for the present invention may be converted into the corresponding anthranilic acid esters by reaction with isatoic acid anhydride. Relatively high molecular weight compounds containing amino end groups may also be obtained by reacting isocyanate prepolymers based on polyhydroxyl polyethers with hydroxyl-containing enamines, aldimines, or ketimines and hydrolyzing the reaction product.

Aminopolyethers obtained by the hydrolysis of compounds containing isocyanate end groups are also preferred amine-terminated polyethers. Preferred amine-terminated polyethers are prepared by hydrolyzing an isocyanate compound having an isocyanate group content of from 0.5 to 40% by weight. The most preferred polyethers are prepared by first reacting a polyether containing two to four hydroxyl groups with an excess of an aromatic polyisocyanate to form an isocyanate terminated prepolymer and then converting the isocyanate groups to amino groups by hydrolysis.

Amine-terminated polyethers useful in the present invention are in many cases mixtures with other isocyanate-reactive compounds having the appropriate molecular weight. These mixtures generally should contain (on a statistical average) two to four isocyanate reactive amino end groups.

Suitable crosslinking agents or chain extenders which may be included in the isocyanate-reactive component of the present invention generally have a molecular weight of less than 399 and a functionality of from about 2 to about 6 (preferably 2 to 4). Chain extenders generally have a functionality of about 2 and crosslinkers generally have a functionality greater than 2. Such compounds typically contain hydroxyl groups, amino groups, thiol groups, or a combination thereof, and generally contain 2 to 8 (preferably 2 to 4) isocyanate-reactive hydrogen atoms.

The chain extender and/or cross-linking agent is generally included in the isocyanate-reactive component in an amount of from about 1 to about 75% by weight, based on total weight of isocyanate-reactive component, preferably, from about 10 to about 65% by weight, most preferably from about 15 to about 55% by weight.

The preferred hydroxyl-containing chain extenders and crosslinkers include glycols and polyols, such as 1,2-ethanediol, 1,2- and 1,3-propylene glycol, 1,4- and 2,3-butylene glycol, 1,6-hexanediol, 1,8-octanediol, neopentyl glycol, cyclohexane-dimethanol, 1-methyl-1,3-propanediol, 2-methyl-1,3-propanediol, glycerol, trimethylol-propane, 1,2,6-hexanetriol, pentaerythritol, 1,2,4-butanetriol, and trimethylolethane.

Suitable chain extenders also include hydroxyl-containing polyethers having a molecular weight of less than 399. Suitable hydroxyl-containing polyethers can be prepared, for example, by the methods discussed above for the higher molecular weight hydroxy-containing polyethers except that only lower molecular weight polyethers are used. Glycerol which has been propoxylated and/or ethoxylated to produce a polyol having a molecular weight of less than 399 is an example. Particularly suitable polyethers include polyoxyalkylene polyether polyols, such as polyoxyethylene diol, polyoxypropylene diol, polyoxybutylene diol, and polytetramethylene diol having the requisite molecular weights.

Amine chain extenders preferably contain exclusively aromatically bound primary or secondary (preferably primary) amino groups and preferably also contain alkyl substituents. Examples of such aromatic diamines include 1,4-diaminobenzene, 2,4- and/or 2,6-diaminotoluene, meta-xylene diamine, 2,4'- and/or 4,4'-diamino-diphenylmethane, 3,3'-dimethyl-4,4'-diaminodiphenylmethane, 1-methyl-3,5-bis(methylthio)-2,4- and/or -2,6-diaminobenzene, 1,3,5-triethyl-2,4-diaminobenzene, 1,3,5-triisopropyl-2,4-diaminobenzene, 1-methyl-3,5-diethyl-2,4- and/or -2,6-diaminobenzene, 4,6-dimethyl-2-ethyl-1,3-diaminobenzene, 3,5,3',5'-tetraethyl-4,4'-diaminodiphenylmethane, 3,5,3',5'-tetraisopropyl-4,4'-diaminodiphenylmethane, and 3,5-diethyl-3',5'-diisopropyl-4,4'-diaminodiphenylmethane. Although generally less preferred, certain (cyclo)aliphatic diamines are also suitable. A particularly suitable (cyclo)aliphatic diamine is 1,3-bis(aminomethyl)cyclohexane. Such diamines may, of course, also be used as mixtures.

Suitable tertiary amine or ammonium compounds useful in the isocyanate-reactive component of the present invention include isocyanate-reactive tertiary amine polyethers, fatty amido-amines, ammonium derivatives of fatty amido-amines and mixtures thereof.

Suitable catalysts include tertiary amines and metal compounds known in the art. Suitable tertiary amine catalysts include triethylamine, tributylamine, N-methylmorpholine, N-ethylmorpholine, N,N,N',N'-tetramethylethylene diamine, pentamethyldiethylene triamine, and higher homologs, 1,4-diazabicyclo[2.2.2]octane, N-methyl-N'-(dimethylaminoethyl)piperazine, bis(dimethylaminoalkyl) piperazines, N,N-dimethylbenzylamine, N,N-dimethylcyclohexylamine, N,N-diethylbenzylamine, bis(N,N-diethylaminoethyl)adipate, N,N,N',N'-tetramethyl-1,3-butanediamine, N,N-dimethyl-β-phenylethylamine, 1,2-dimethylimidazole, 2-methylimidazole, monocyclic and bicyclic amidines, bis(dialkylamino)alkyl ethers (U.S. Pat. No. 3,330,782), and tertiary amines containing amide groups (preferably formamide groups). The catalysts used may also be the known Mannich bases of secondary amines (such as dimethylamine) and aldehydes (preferably formaldehyde) or ketones (such as acetone) and phenols.

Suitable catalysts also include certain tertiary amines containing isocyanate reactive hydrogen atoms. Examples of such catalysts include triethanolamine, triisopropanolamine, N-methyldiethanolamine, N-ethyldiethanolamine, N,N-dimethylethanolamine, their reaction products with alkylene oxides (such as propylene oxide and/or ethylene oxide) and secondary-tertiary amines.

Other suitable catalysts include organic metal compounds, especially organic tin, bismuth, and zinc compounds. Suitable organic tin compounds include those containing sulfur, such as dioctyl tin mercaptide and, preferably, tin(II) salts of carboxylic acids, such as tin(II) acetate, tin(II) octoate, tin(II) ethylhexoate, and tin(II) laurate, as well as tin(IV) compounds, such as dibutyltin dilaurate, dibutyltin dichloride, dibutyltin diacetate, dibutytin maleate, and dioctyltin diacetate. Suitable bismuth compounds include bismuth neodecanoate, bismuth versalate, and various bismuth carboxylates known in the art. Suitable zinc compounds include zinc neodecanoate and zinc versalate. Mixed metal salts containing more than one metal (such as carboxylic acid salts containing both zinc and bismuth) are also suitable catalysts.

Any of the above-mentioned catalysts may, of course, be used as mixtures.

The catalyst is generally included in the isocyanate-reactive component in an amount of from about 0.01 to about 7% by weight, based on total weight of isocyanate-reactive component, preferably from about 0.5 to about 6% by weight, most preferably from about 1 to about 5% by weight.

Suitable blowing agents for use in the preparation of polyurethane foams include water and/or readily volatile organic substances. Organic blowing agents include acetone, ethyl acetate, methanol, ethanol, low-boiling hydrocarbons (such as butane, hexane, or heptane) or fluorocarbons, chlorofluorocarbons, hydrochlorofluorocarbons, or other halogen-substituted alkanes (such as methylene chloride, chloroform, ethylidene chloride, vinylidene chloride, monofluorotrichloro-methane, chlorodifluoromethane, and dichlorodifluoromethane), diethyl ether, or carboxylic acids (such as lactic acid, citric acid, and malonic acid), as well as carbon dioxide generated by the hydrolysis of isocyanate groups. A blowing effect may also be obtained by adding compounds which decompose at temperatures above room temperature and thereby give off gases such as nitrogen (for example, azo compounds such as azoisobutyronitrile or carbon dioxide (such as dimethyl dicarbonate).

The blowing agent is generally included in the isocyanate-reactive component in an amount of from about 0.05 to about 7% by weight, based on total weight of isocyanate-reactive component, preferably from about 0.1 to about 6% by weight, most preferably from about 0.5 to about 5% by weight.

Other additives which may optionally be included in the isocyanate-reactive component of the invention and include, for example, flame retardants, internal mold release agents, surfactants, acid scavengers, water scavengers, cell regulators, pigments, dyes, UV stabilizers, plasticizers, fungistatic or bacteriostatic substances, and fillers.

Suitable flame retardants (which, as the term is used herein, also include smoke suppressants and other known combustion modifiers), include phosphonates, phosphites, and phosphates (such as dimethyl methylphosphonate, ammonium polyphosphate, and various cyclic phosphate and phosphonate esters known in the art); halogen-containing compounds known in the art (such as brominated diphenyl ether and other brominated aromatic compounds); melamine; antimony oxides (such as antimony pentoxide and antimony trioxide); zinc compounds (such as various known zinc borates); aluminum compounds (such as alumina trihydrate); and magnesium compounds (such as magnesium hydroxide).

Internal mold release agents are compounds that are added to the reactive components of the isocyanate addition reaction, usually the isocyanate-reactive component, to assist in the removal of a polyurethane product from a mold. Suitable internal mold release agents for the present invention include those based at least in part on fatty acid esters (e.g., U.S. Pat. Nos. 3,726,952, 3,925,527, 4,058,492, 4,098,731, 4,201,847, 4,254,228, 4,868,224, and 4,954,537); metal and/or amine salts of carboxylic acids, amido carboxylic acids, phosphorus-containing acids, or boron-containing acids (e.g., U.S. Pat. Nos. 4,519,965, 4,581,386, 4,585,803, 4,876,019, and 4,895,879); polysiloxanes (e.g., U.S. Pat. No. 4,504,313); amidines (e.g., U.S. Pat. Nos. 4,764,540, 4,789,688, and 4,847,307); resins prepared by the reaction of isocyanate prepolymers and a polyamine-polyimine component (e.g., U.S. Pat. No. 5,198,508); and neutralized esters prepared from certain amine-started tetrahydroxy compounds described In U.S. Pat. No. 5,208,268.

Surfactants (or surface-active agents) include emulsifiers and foam stabilizers. Examples of suitable surfactants include any of several silicone surfactants known in the art (including, for example, those available commercially from Dow Corning Corporation, Union Carbide Chemical and Plastics Co., Inc., and Rhein Chemie Corporation), as well as various amine salts of fatty acids (such as diethyl-amine oleate or diethanolamine stearate) and sodium salts of ricinoleic acids.

Acid scavengers are compounds that control the acidity and water concentration of the compositions of the invention. Preferred acid scavengers include various orthoesters (such as trimethyl orthoformate), carbodiimides (such as 2,2',6,6'-tetraisopropyidiphenylcarbodiimide, available as STABOXAL I and STABOXAL P from Rhein Chemie Corp.), and epoxides (such as 3,4-epoxycyclohexylmethyl 3,4-epoxy-cyclohexylcarboxylate, available as ERL-4221 from Union Carbide).

Water scavengers (or moisture scavengers) are compounds that maintain a low water content in the compositions of the invention. Suitable water scavengers are described, for example, in U.S. Pat. Nos. 3,755,222 and 4,695,618. Examples of suitable water scavengers include alkali aluminosilicates (available as BAYLITH L, BAYLITH T, and BAYLITH W powders or pastes from Bayer AG, Germany) and chemically reacting water scavengers (such as ZOLDINE MS-Plus from Angus Chemical Company).

Known fillers and/or reinforcing substances, such as barium sulfate, calcium carbonate, calcium silicate, clays, kieselguhr, whiting, mica, and especially glass fibers, liquid crystal fibers, glass flakes, glass balls, microspheres, aramide fibers, and carbon fibers, are also suitable.

The storage-stable isocyanate-reactive compositions of the present invention can be prepared by mixing the individual components in any order but are preferably prepared by combining the base polyols first and subsequently adding any catalyst, blowing agent, filler, etc. to the polyol mixture.

The isocyanate-reactive compositions of the present invention can be used for the preparation of various urethane-based products by reaction injection molding ("RIM"). As used herein, the term "polyurethane" also refers to polyureas and polyurethane polyurea hybrids.

When preparing polyurethanes according to the invention by the isocyanate addition reaction, the isocyanate-reactive component is allowed to react with an organic polyisocyanate. Suitable polyisocyanates are known in the art. Suitable polyisocyanates can be unmodified isocyanates, modified polyisocyanates, or isocyanate prepolymers. Suitable organic polyisocyanates include aliphatic, cycloaliphatic, araliphatic, aromatic, and heterocyclic polyisocyanates of the type described, for example, by W. Siefken in *Justus Liebigs Annalen der Chemie*, 562, pages 75 to 136. Examples of such isocyanates include those represented by the formula $$Q(NCO)_n$$

in which n is a number from 2 to about 5 (preferably 2 to 3) and Q is an aliphatic hydrocarbon group containing 2 to about 18 (preferably 6 to 10) carbon atoms, a cycloaliphatic hydrocarbon group containing 4 to about 15 (preferably 5 to 10) carbon atoms, an araliphatic hydrocarbon group containing 8 to 15 (preferably 8 to 13) carbon atoms, or an aromatic hydrocarbon group containing 6 to about 15 (preferably 6 to 13) carbon atoms. Examples of suitable isocyanates include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3-and -1,4-diisocyanate, and mixtures of these isomers; 1-isocyanato-3,3,5-trimethyl-5-isocyanatomethyl-cyclohexane ("isophorone diisocyanate"); 2,4- and 2,6-hexahydrotoluene diisocyanate and mixtures of these isomers; dicyclohexylmethane-4,4'-diisocyanate ("hydrogenated MDI", or "HMDI"); 1,3- and 1,4-phenylene diisocyanate; 2,4- and 2,6-toluene diisocyanate and mixtures of these isomers ("TDI"); diphenylmethane-2,4'- and/or -4,4'-diisocyanate ("MDI"); naphthylene-1,5-diisocyanate; triphenyl-methane-4,4',4"-triisocyanate; polyphenyl-polymethylene-polyisocyanates of the type which may be obtained by condensing aniline with formaldehyde, followed by phosgenation ("crude MDI"); norbornane diisocyanates; m- and p-isocyanatophenyl sulfonylisocyanates; perchlorinated aryl polyisocyanates; modified polyisocyanates containing carbodiimide groups; modified polyisocyanates containing urethane groups; modified polyisocyanates containing allophanate groups; modified polyisocyanates containing isocyanurate groups; modified polyisocyanates containing urea groups; polyisocyanates containing biuret groups; polyisocyanates obtained by telomerization reactions; polyisocyanates containing ester groups; reaction products of the above-mentioned isocyanates with acetals; and polyisocyanates containing polymeric fatty acid groups. It is also possible to use the isocyanate-containing distillation residues accumulating in the production of isocyanates on a commercial scale, optionally in solution in one or more of the polyisocyanates mentioned above. It is also possible to use mixtures of the polyisocyanates described above.

In general, it is preferred to use readily available polyisocyanates, such as 2,4- and 2,6-toluene diisocyanates and mixtures of these isomers ("TDI"); polyphenyl-polymethylene-polyisocyanates of the type obtained by condensing aniline with formaldehyde, followed by phosgenation ("crude MDI"); and polyisocyanates containing carbodiimide groups, urethane groups, allophanate groups, isocyanurate groups, urea groups, or biuret groups ("modified polyisocyanates").

It is, of course, also possible to use isocyanate prepolymers prepared by reaction of any of the above polyisocyanates with a sub-stoichiometric amount of an isocyanate-reactive compound.

Machines useful for conducting the RIM process of the present invention are known to those skilled in the art and are commercially available from Hennecke, Krauss-Maffei Corporation and Cannon, Inc.

When carrying out a reaction of an isocyanate-reactive composition according to the invention with an isocyanate, the quantity of isocyanate component should preferably be such that the isocyanate index is from 80 to 130, preferably from 90 to 120, most preferably from 100 to 120. By "isocyanate index" is meant the quotient of the number of isocyanate groups divided by the number of isocyanate-reactive groups, multiplied by 100.

Molded foams prepared using the compositions of the present invention are prepared by a RIM process. In RIM processes, generally two separate streams are intimately mixed and subsequently into a suitable mold. The first stream is generally the isocyanate component and the second stream is typically the isocyanate-reactive component. The catalyst, blowing agent and other additives are typically included in the isocyanate-reactive component. More than two streams may, however, be used in such processes. Suitable mold materials include metals (for example, aluminum or steel) or plastics (for example, unsaturated polyester resin or epoxide resin). In the mold, the foamable reaction mixture foams to form the molded product.

In the preparation of the rigid, closed-cell polyurethane foams in accordance with the present invention, preferred isocyanate-reactive compositions of the invention include: (1) from 0.5 to 30% by weight (more preferably from 5 to 25% by weight, most preferably from 10 to 20% by weight) of blown bio-based oil; (2) from 5 to 80% by weight (more preferably from 5 to 60% by weight) of a polyether polyol having a molecular weight of at least 400; (3) from 1 to 75% by weight (more preferably from 10 to 65% by weight) of chain extender or crosslinker; (4) from 0.05 to 7% by weight (more preferably from 0.1 to 6% by weight) of blowing agent; and (5) from 0.01 to 7% by weight (more preferably from 0.5 to 6% by weight) of catalyst, all amounts being based on the total amount of materials present in the isocyanate-reactive component. Other, optional additives, if included, are generally used in an amount of from 1 to 30% by weight, based on total weight of isocyanate-reactive component.

The polyurethane foams produced in accordance with the present invention are rigid foams having a closed cell content of at least 90%, preferably at least 95%, most preferably approximately 100%. These rigid foams have densities of from 8 to 55 lbs/ft$^3$, preferably from 15 to 55, most preferably from 25 to 45. These foams have a Shore D hardness of at least 40, preferably from 50–75. The heat sag values for foams made in accordance with the present invention are at least slightly better than for foams made with the traditional polyether polyols, but generally are substantially better than the heat sag values for the traditional foams made with polyether polyols only. Similarly, the heat distortion temperature for foams made in accordance with the present invention are at least high, but generally higher, than those for foams made with traditional polyether polyols only. The other physical properties of the foams made in accordance with the present invention are comparable to those of rigid foams produced with traditional polyether polyols only.

The improvement in heat sag and heat distortion temperature found in the rigid, closed cell polyurethane foams produced in accordance with the present invention was not achieved when the bio-based polyols employed in the present invention were used in addition to or as a partial replacement for traditional polyether polyols employed in the production of polyurethane elastomers.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following starting materials were used in the Examples:

POLYOL A (PA) a polymerized soybean oil having a hydroxyl functionality of 1.8, a hydroxyl number of 51.8 and an equivalent weight of 1100 which is commercially available under the name SoyOyl P38.05 (low odor) from Urethane Soy Systems Co., Inc.

POLYOL B (PB) a polymerized soybean oil having a hydroxyl functionality of 3, a hydroxyl number of 174 and an equivalent weight of 322 which is commercially available under the name SoyOyl P38.GC5 from Urethane Soy Systems Co., Inc.

POLYOL C (PC) a polymerized soybean oil having a hydroxyl functionality of 3.4, a hydroxyl number of 65.8 and an equivalent weight of 850 which is commercially available under the name SoyOyl P56.05 from Urethane Soy Systems Co., Inc.

POLYOL D (PD) glycerol-started polyether of propylene oxide and ethylene oxide (83 wt. % propylene oxide and 17 wt. % ethylene oxide) having a hydroxyl number of 28 and a functionality of 3.

POLYOL E (PE) Glycerol-started polyether of propylene oxide having a functionality of 3 and a hydroxyl number of 1050 (molecular weight about 160)

CATALYST A (CA) N,N-dimethylcyclohexylamine (available as POLYCAT 8 from Air Products & Chemicals, Inc.)

CATALYST B (CB) Glycol acid salt of tetraethylenediamine and 1,1-dibutyltin diacetate (available as DABCO DC-2 from Air Products & Chemicals, Inc.)

LA Lactic acid

SURFACTANT (SF)Silicone surfactant available as Dow Corning 193 from Dow Corning Corporation BLOWING AGENT(BA) Water PU-1748 (PU) A quaternary ammonium salt of the amide of tall oil and N,N' dimethyl-1,3-diamine propane.

ISOCYANATE A (IA) polymeric diphenylmethane diisocyanate having an NCO content of 31.5% by weight which is commercially available from Bayer Corporation under the name Mondur MR.

ISOCYANATE B (IB) modified diphenylmethane diisocyanate having an NCO content of 27% by weight which is commercially available from Bayer Corporation under the name Mondur 486.

The properties of the rigid, closed-cell polyurethane foams made in the Examples and reported in Tables 2, 4, 6, 7, 8 and 9 were as follows:

TH Thickness Measured (reported in inches)

D Density Determined in accordance with ASTM D 3574 (reported in lb/ft$^3$)

CCC Closed Cell Content (reported in %)

SD 1 Hardness, Shore D Determined in accordance with ASTM D 2240 1 second

SD 5 Hardness, Shore D Determined in accordance with ASTM D 2240 5 seconds

CI Charpy Impact Determined by modified ASTM D 256 in which sample was impacted on 0.5 inch sample face (reported in ft-lb/in$^2$)

M Flex Modulus Determined in accordance with ASTM D 790 (reported in psi×10)

FS Flex Strength Determined in accordance with ASTM D 790 (reported in psi)

TS Tensile Strength Determined in accordance with ASTM D 412 (reported in psi)

E Elongation Determined in accordance with ASTM D 412 (reported in %)

HDT Heat Distortion Determined in accordance with ASTM D 648 Temperature @66 psi (reported in ° C.)

CS Compression Strength Determined in accordance with ASTM D 695 @25% (reported in psi)

IZU Izod, unnotched Determined in accordance with ASTM D 256 (reported in ft-lb/in)

HSPC High Speed 5 mph, Determined in accordance with ASTM D 3763 Puncture @crack (reported in ft-lbs)

HSPP High Speed 5 mph, Determined in accordance with ASTM D 3763 Puncture @peak (reported in lbs)

HS Heat Sag, 1 hr 250° F. Determined in accordance with ASTM D3769 (reported in mm)

CTE121 Coefficient of Determined in accordance with ASTM D696 Thermal Expansion @121° C. (reported in in/in/° C.×10$^{-6}$)

CTE70 Coefficient of Determined in accordance with ASTM D696 Thermal Expansion @70° C. (reported in in/in/° C.×10$^{-6}$)

CTE-40 Coefficient of Determined in accordance with ASTM D696 Thermal Expansion @-40° C. (reported in in/in/° C.×10$^{-6}$)

Examples 1–9

An isocyanate-reactive component composed of the materials listed in Table 1 in the amounts indicated in parts by weight in Table 1 was prepared. This isocyanate-reactive component was then reacted with ISOCYANATE B in an amount such that the Isocyanate Index was 110 using a Cannon HE-120 RIM machine. The reaction mixture was introduced into an aluminum plaque mold heated to a temperature of 60–77° C. The properties of the molded article are reported in Table 2.

TABLE 1

| Mat'l. | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| PD | 55 | 55 | 55 | 55 | 55 | 55 | 55 | 55 | 55 |
| PE | 45 | 45 | 45 | 45 | 45 | 45 | 45 | 45 | 45 |
| SF | 3 | 3 | 3 | 3 | 3 | 3 | 3 | 3 | 3 |
| PU | 6 | 6 | 6 | 6 | 6 | 6 | 6 | 6 | 6 |
| BA | 0.7 | 0.7 | 0.7 | 0.7 | 0.7 | 0.7 | 0.7 | 0.7 | 0.7 |
| PA | — | 1 | 5 | 10 | 30 | — | — | — | — |
| PC | — | — | — | — | — | 1 | 5 | 10 | 30 |
| LA | 3 | 3 | 3 | 3 | 3 | 3 | 3 | 3 | 3 |
| CA | 4 | 4 | 4 | 4 | 4 | 4 | 4 | 4 | 4 |
| CB | 0.2 | 0.2 | 0.2 | 0.2 | 0.2 | 0.2 | 0.2 | 0.2 | 0.2 |

TABLE 2

| Test | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| TH | 0.25 | 0.25 | 0.25 | 0.25 | 0.25 | 0.25 | 0.25 | 0.25 | 0.25 |
| D | 46.4 | 45.5 | 45.5 | 45.2 | 44.1 | 45.3 | 45.2 | 44.2 | 44.2 |
| SD1 | 69 | 71 | 70 | 69 | 66 | 72 | 72 | 71 | 68 |
| SD5 | 69 | 70 | 69 | 69 | 65 | 71 | 72 | 71 | 68 |
| CI | 8.1 | 13 | 11.8 | 10.9 | 11.7 | 11.4 | 9.8 | 10.4 | 13.7 |
| FM | 16068 | 16148 | 15466 | 15742 | 10970 | 16182 | 15390 | 14674 | 11606 |
| FS | 5566 | 5717 | 5573 | 5541 | 4140 | 5829 | 5737 | 5296 | 4178 |
| TS | 3040 | 3170 | 3101 | 3017 | 2455 | 3022 | 2832 | 2957 | 2523 |
| E | 8.44 | 9.36 | 9.08 | 8.36 | 10.08 | 6.12 | 6.28 | 9 | 12.02 |
| HDT | 57.8 | 56.5 | 57.6 | 57.3 | 54.3 | 58.5 | 57.2 | 55.2 | 53.7 |
| CS | 4569 | 2269 | 4529 | 4218 | 3820 | 4459 | 4533 | 4120 | 3930 |
| CCC | >90 | >90 | >90 | >90 | >90 | >90 | >90 | >90 | >90 |

These Examples illustrate simple addition of blown soybean oil to a polyurethane forming reaction mixture processed by a RIM process without modification of that polyurethane forming reaction mixture does not offer any significant advantage with respect to the physical properties of the polyurethane foam but also does not adversely affect the foam's physical properties. Since such a system would be more expensive due to the cost of the added blown soybean oil without any savings due to elimination of a more expensive material from the isocyanate-reactive component, there would be no commercial advantage to a process in which blown soybean oil is merely added to an existing system.

Examples 10–18

An isocyanate-reactive component composed of the materials listed in Table 3 in the amounts indicated in parts by weight in that table was prepared. This isocyanate-reactive component was then reacted with ISOCYANATE B in an amount such that the Isocyanate Index was 110 using a Cannon HE-120 RIM machine. The reaction mixture was introduced into an aluminum plaque mold. The properties of the molded article are reported in Table 4.

TABLE 3

| Mat'l. | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| PD | 55 | 55 | 55 | 55 | 55 | 55 | 55 | 55 | 55 |
| PE | 45 | 30 | 20 | 10 | — | 45 | 45 | 45 | 45 |
| SF | 3 | 3 | 3 | 3 | 3 | 3 | 3 | 3 | 3 |
| PU | 6 | 6 | 6 | 6 | 6 | 6 | 6 | 6 | 6 |
| BA | 0.7 | 0.7 | 0.7 | 0.7 | 0.7 | 0.7 | 0.7 | 0.7 | 0.7 |
| PA | — | 15 | 25 | 35 | 45 | — | — | — | — |
| PB | — | — | — | — | — | 1 | 5 | 10 | 30 |
| LA | 3 | 3 | 3 | 3 | 3 | 3 | 3 | 3 | 3 |
| CA | 4 | 4 | 4 | 4 | 4 | 4 | 4 | 4 | 4 |
| CB | 0.2 | 0.2 | 0.2 | 0.2 | 0.2 | 0.2 | 0.2 | 0.2 | 0.2 |

TABLE 4

| Test | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| TH | 0.25 | 0.25 | 0.25 | 0.25 | 0.25 | 0.25 | 0.25 | 0.25 | 0.25 |
| D | 45.4 | 44.5 | 45.2 | 45.3 | 46.1 | 45.6 | 46.0 | 45.1 | 45.3 |
| SD1 | 76 | 75 | 70 | 73 | 69 | 75 | 75 | 75 | 74 |
| SD5) | 74 | 72 | 69 | 71 | 67 | 72 | 73 | 72 | 71 |
| CI | 10.1 | 12.2 | 12.7 | 8.3 | 5 | 10.3 | 11.8 | 14.1 | 14.1 |
| FM | 18389 | 17847 | 17543 | 17152 | 14988 | 17865 | 17270 | 16346 | 13518 |
| FS | 6257 | 6315 | 6089 | 5965 | 3662 | 6371 | 6106 | 5795 | 4810 |
| TS | 3333 | 3284 | 3251 | 3121 | 2115 | 3548 | 3454 | 3412 | 2871 |
| E | 0 | 0 | 0 | 0 | 0 | 0 | 0 | 0 | 0 |
| CS | 4474 | 4478 | 4583 | 4485 | 4359 | 5028 | 4883 | 4656 | 4203 |
| CCC | >90 | >90 | >90 | >90 | >90 | >90 | >90 | >90 | >90 |

These Examples illustrate systems in which a portion of a more expensive polyol in the polyurethane forming reaction mixture is replaced with the blown soybean oil in various amounts. It can be seen from the Tables that when up to about 30% by weight of the polyol was replaced with blown soybean oil, the physical properties of the polyurethane foam were not adversely affected. There would therefore be a commercial advantage to polyurethane forming reaction mixtures in which up to about 30% by weight of the more expensive polyol is replaced with blown soybean oil because the physical properties of the foam are not adversely affected when a less expensive and more environmentally friendly reaction mixture (i.e., mixture in which blown soybean oil replaces significant portion of polyether polyol).

Examples 19–30

An isocyanate-reactive component composed of the materials listed in Table 5 in the amounts indicated in parts by weight in Table 5 was prepared. The isocyanate-reactive component was then reacted with ISOCYANATE A in an amount such that the Isocyanate Index was 110 using a Cannon HE-120 RIM machine. The reaction mixture was introduced into an aluminum plaque mold. The properties of the molded article are reported in Table 6.

TABLE 5

| Mat'l | PD | PE | SF | PU | CB | PA | LA | CA | BA |
|---|---|---|---|---|---|---|---|---|---|
| Ex 19 | 55 | 45 | 3 | 6 | 0.2 | — | 3 | 4 | 0.7 |
| Ex 20 | 55 | 45 | 3 | 6 | 0.2 | — | 3 | 4 | 0.7 |
| Ex 21 | 55 | 45 | 3 | 6 | 0.2 | — | 3 | 4 | 0.7 |
| Ex 22 | 55 | 45 | 3 | 6 | 0.2 | — | 3 | 4 | 0.7 |
| Ex 23 | 55 | 33 | 3 | 6 | 0.2 | 12 | 3 | 4 | 0.7 |
| Ex 24 | 55 | 33 | 3 | 6 | 0.2 | 12 | 3 | 4 | 0.7 |
| Ex 25 | 55 | 33 | 3 | 6 | 0.2 | 12 | 3 | 4 | 0.7 |
| Ex 26 | 55 | 33 | 3 | 6 | 0.2 | 12 | 3 | 4 | 0.7 |
| Ex 27 | 55 | 22 | 3 | 6 | 0.2 | 23 | 3 | 4 | 0.7 |
| Ex 28 | 55 | 22 | 3 | 6 | 0.2 | 23 | 3 | 4 | 0.7 |
| Ex 29 | 55 | 22 | 3 | 6 | 0.2 | 23 | 3 | 4 | 0.7 |
| Ex 30 | 55 | 22 | 3 | 6 | 0.2 | 23 | 3 | 4 | 0.7 |

TABLE 6

| Test | D | SD1 | SD5 | FM | FS | TS | E | CI | IZU | HSPC | HSPP | HDT | HS | CTE 121 | CTE 70 | CTE-40 | CS | CCC |
|---|---|---|---|---|---|---|---|---|---|---|---|---|---|---|---|---|---|---|
| Ex 19 | 29.53 | 57 | 55 | 8981 | 2996 | 1690 | 8.6 | 6.9 | 1.47 | 1.2 | 2.8 | 80.3 | 3.5 | 80.2 | 75.73 | 69.27 | 1973 | >90 |
| Ex 20 | 34.14 | 61 | 58 | 11097 | 3796 | 2108 | 9.1 | 9.6 | 1.7 | 1.5 | 5.2 | 97.8 | 4.17 | 99.4 | 92.22 | 81.96 | 2631 | >90 |
| Ex 21 | 38.91 | 67 | 65 | 14410 | 4996 | 2978 | 7.9 | 10.1 | 2.3 | 2.0 | 4.9 | 99.7 | 2.67 | 95.7 | 88.30 | 76.77 | 3627 | >90 |
| Ex 22 | 43.20 | 75 | 71 | 16243 | 5760 | 3425 | 8.2 | 9.5 | 2.2 | 2.0 | 7.2 | 104.6 | 2.33 | 103.9 | 93.75 | 79.27 | 4534 | >90 |
| Ex 23 | 29.98 | 61 | 57 | 9030 | 3007 | 1579 | 7.2 | 6.5 | 1.3 | 1.1 | 2.6 | 82.5 | 3.67 | 110.9 | 96.77 | 76.53 | 1936 | >90 |
| Ex 24 | 35.44 | 65 | 61 | 11087 | 3817 | 2325 | 7.9 | 8.8 | 1.8 | 1.5 | 3.9 | 89.9 | 3.33 | 83.8 | 82.43 | 80.52 | 2768 | >90 |
| Ex 25 | 37.42 | 72 | 68 | 12380 | 4631 | 2508 | 8.6 | 10.1 | 1.7 | 1.6 | 3.8 | 99.0 | 1.67 | 78.3 | 79.99 | 82.38 | 3604 | >90 |
| Ex 26 | 43.72 | 74 | 72 | 14343 | 5356 | 3376 | 7.6 | 9.9 | 2.7 | 1.7 | 5.3 | 106.3 | 1.67 | 103.0 | 93.46 | 79.77 | 4727 | >90 |
| Ex 27 | 28.96 | 58 | 55 | 9488 | 3145 | 1648 | 7.9 | 6 | 1.2 | 1.0 | 1.7 | 108.1 | 0.67 | 69.0 | 70.1 | 72.35 | 1934 | >90 |
| Ex 28 | 35.28 | 65 | 62 | 11567 | 3859 | 2023 | 8.1 | 8.2 | 1.4 | 1.4 | 2.9 | 108.8 | 0.17 | 72.2 | 74.03 | 77.77 | 2749 | >90 |

TABLE 6-continued

| Test | D | SD1 | SD5 | FM | FS | TS | E | CI | IZU | HSPC | HSPP | HDT | HS | CTE 121 | CTE 70 | CTE-40 | CS | CCC |
|---|---|---|---|---|---|---|---|---|---|---|---|---|---|---|---|---|---|---|
| Ex 29 | 39.50 | 70 | 67 | 13870 | 4774 | 2529 | 8.1 | 11.1 | 1.6 | 1.9 | 3.9 | 112.0 | 1.33 | 90.5 | 84.6 | 72.7 | 3634 | >90 |
| Ex 30 | 43.27 | 70 | 67 | 16403 | 5710 | 3039 | 7.3 | 11.5 | 2.6 | 2.2 | 4.1 | 104.2 | 0.83 | 101.1 | 93.63 | 78.73 | 4502 | >90 |

These Examples illustrate polyurethane foams produced from foam-forming mixtures in: (1) no blown soybean oil was included in the isocyanate-reactive component (Examples 19–22); (2) approximately 25% of the lower molecular weight polyether polyol was replaced with blown soybean oil (Examples 23–26); and (3) approximately 50% of the lower molecular weight polyether polyol was replaced with blown soybean oil (Examples 27–30). Plaques having different densities were prepared from each of these mixtures.

It can be seen from the data presented in Table 6, that the Heat Sag and Heat Distortion Temperature of the plaques made in accordance with the present invention (i.e., with blown soybean oil in the isocyanate-reactive component) were significantly better than the plaques having comparable density which had not been produced from an isocyanate-reactive component that included blown soybean oil. The other physical properties of the tested plaques were comparable. The advantages achieved by replacing a portion of the traditional polyether polyol with a blown soybean oil were seen at all densities.

Examples 31–42

Figure 1:
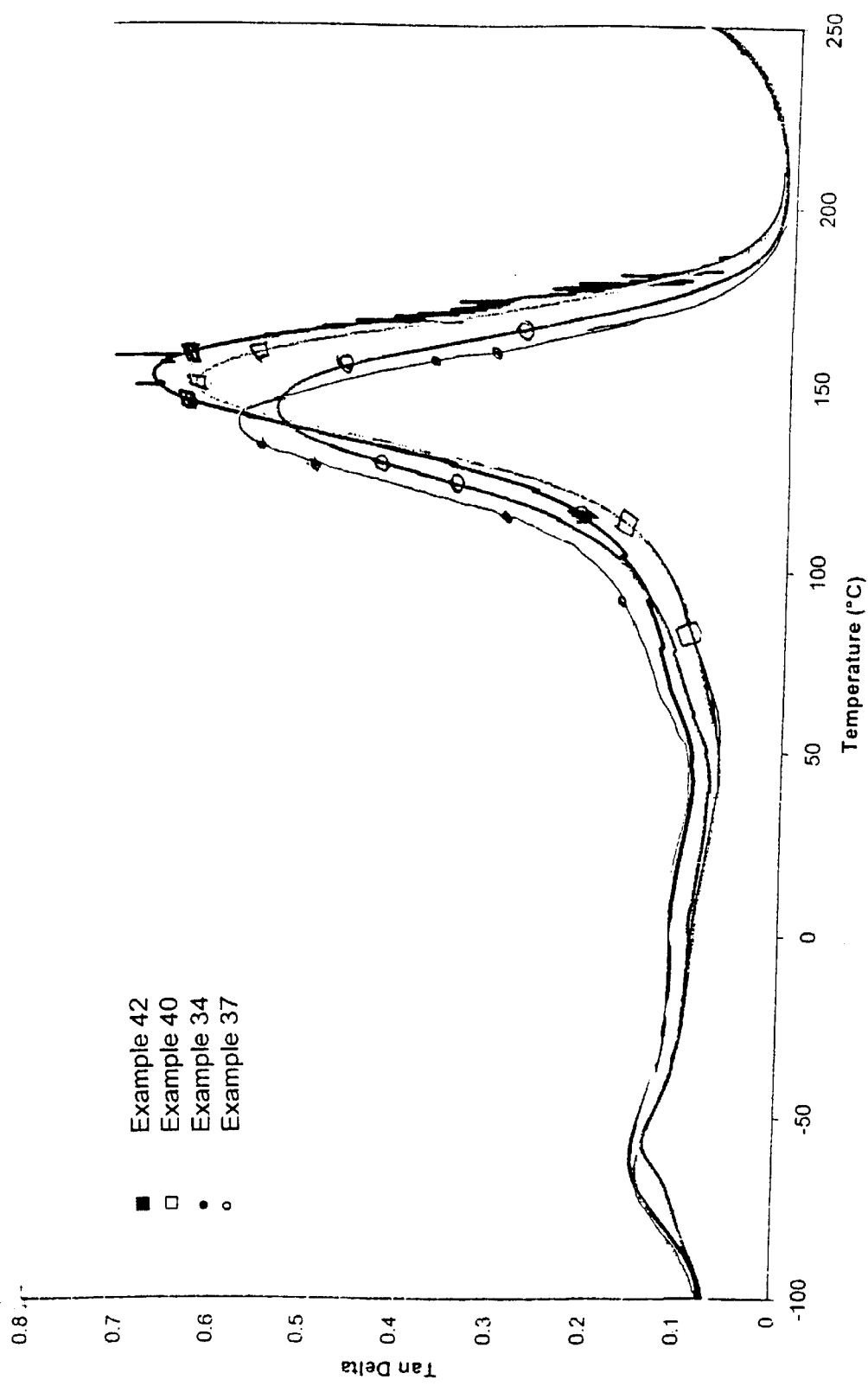
FIG. 1 is a graph on which Tan Delta (E'/E") is plotted vs Temperature for molded articles having a density of 45 pounds per cubic foot or 35 pounds per cubic foot made from systems containing 20% by weight blown soybean oil and systems made without blown soybean oil.

The isocyanate-reactive compositions described in Table 5 were also reacted with ISOCYANATE B in an amount such that the Isocyanate Index was 110 using a Cannon HE-120 RIM machine. The reaction mixture was introduced into an aluminum plaque mold. The properties of the molded article are reported in Table 7.

bio-based polyol) are graphically demonstrated in FIG. 1 in which Tan Delta (E'/E") is plotted against Temperature in ° C.

TMA analysis was also conducted on each of the plaques produced in Examples 19–30 using a Perkin Elmer TMA7 in the penetration mode. The plaques were heated to temperatures of from −50° C. to 250° C. at 5° C. per minute. Liquid nitrogen was used as the coolant and helium gas was used as the purge. The force on the probe was 500 mN. The results are this analysis are given in Table 8 below and are graphically presented in FIGS. 2 (plaques from Examples 31, 35 and 39), 3 (plaques from Examples 32, 36 and 40), 4 (plaques from Examples 33, 37 and 41) and 5 (plaques from Examples 34, 38 and 42).

TABLE 8

| EXAMPLE | D | $T_{onset}$(° C.)* |
|---|---|---|
| 31 | 30 | 122 |
| 35 | 30 | 129 |
| 39 | 30 | 129 |
| 32 | 35 | 109 |
| 36 | 35 | 121 |
| 40 | 35 | 123 |
| 33 | 40 | 115 |
| 37 | 40 | 118 |
| 41 | 40 | 127 |
| 34 | 45 | 116 |

TABLE 7

| Test | Polyol | D | SD1 | SD5 | FM | FS | TS | E | CI | IZU | HSPC | HSPP | HDT | HS | CTE 121 | CTE 70 | CTE-40 | CS | CCC |
|---|---|---|---|---|---|---|---|---|---|---|---|---|---|---|---|---|---|---|---|
| Ex 31 | Ex 19 | 30 | 58 | 56 | 8772 | 2310 | 1651 | 11 | 9.6 | 1.9 | 1.6 | 3.8 | 74.2 | 12 | 154.7 | 111.4 | 49.4 | 1995 | >90 |
| Ex 32 | Ex 20 | 34.61 | 65 | 63 | 10340 | 3410 | 2084 | 12 | 11.1 | 2.3 | 1.9 | 5.3 | 81.6 | 10.8 | 138.6 | 108.7 | 66.1 | 2751 | >90 |
| Ex 33 | Ex 21 | 39.72 | 70 | 68 | 12917 | 4320 | 2776 | 10 | 13.5 | 3.4 | 2.3 | 6.0 | 91.1 | 8.8 | 140.1 | 116.6 | 83.1 | 3771 | >90 |
| Ex 34 | Ex 22 | 44.14 | 74 | 72 | 15133 | 5221 | 3377 | 11 | 16.1 | 3.9 | 2.6 | 7.4 | 97.3 | 5.7 | 205.0 | 146.8 | 63.5 | 4624 | >90 |
| Ex 35 | Ex 23 | 29.46 | 58 | 55 | 8873 | 2849 | 1632 | 9 | 7.6 | 1.9 | 1.4 | 4.1 | 78.7 | 7.2 | 232.0 | 148.7 | 29.8 | 1949 | >90 |
| Ex 36 | Ex 24 | 34.69 | 65 | 62 | 7630 | 3600 | 2157 | 11 | 9.5 | 2.4 | 1.7 | 4.9 | 86.8 | 5.8 | 114.1 | 95.7 | 69.3 | 2728 | >90 |
| Ex 37 | Ex 25 | 39.81 | 70 | 68 | 13010 | 4345 | 2707 | 9 | 12.3 | 3.1 | 2.0 | 6.8 | 92.3 | 6.0 | 112.1 | 98.8 | 79.7 | 3530 | >90 |
| Ex 38 | Ex 26 | 44.05 | 71 | 68 | 15663 | 5438 | 3173 | 11 | 15.5 | 3.8 | 2.6 | 7.7 | 97.4 | 3.2 | 85.6 | 82.3 | 77.5 | 4501 | >90 |
| Ex 39 | Ex 27 | 29.46 | 58 | 54 | 8664 | 2807 | 1616 | 10 | 6.8 | 1.6 | 1.1 | 2.9 | 77.2 | 11.0 | 131.1 | 102.2 | 60.8 | 1901 | >90 |
| Ex 40 | Ex 28 | 34.27 | 62 | 59 | 11030 | 3633 | 2106 | 10 | 8.3 | 2.3 | 1.6 | 4.9 | 84.9 | 6.3 | 177.9 | 120.7 | 38.8 | 2758 | >90 |
| Ex 41 | Ex 29 | 39.38 | 67 | 64 | 13377 | 4476 | 2638 | 10 | 12.4 | 2.7 | 2.0 | 6.3 | 91.8 | 6.2 | 74.8 | 76.8 | 79.6 | 3728 | >90 |
| Ex 42 | Ex 30 | 44.66 | 70 | 67 | 15663 | 5374 | 3222 | 12 | 14.5 | 3.2 | 3.0 | 7.8 | 98.8 | 4.7 | 81.2 | 80.0 | 77.6 | 4563 | >90 |

These Examples illustrate polyurethane foams produced from the same foaming mixtures which were used in Examples 19–30 with the exception that a different isocyanate was used. The properties of the resultant rigid foams at given densities were substantially the same as those obtained in Examples 19–30, i.e., improved Heat Sag and Heat Distortion Temperature were achieved without detrimentally affecting the other physical properties of the foam.

The improved dynamic mechanical properties of the plaques produced in Examples 40 and 42 (in accordance with the invention) and in Examples 32 and 34 (no blown TABLE 8-continued

| EXAMPLE | D | $T_{onset}$(° C.)* |
|---|---|---|
| 38 | 45 | 122 |
| 42 | 45 | 124 |

*obtained from peak derivative of height % curve

Plaques produced in accordance with Examples 32, 36 and 40 were also subjected to TMA analysis using a Perkin Elmer TMA7 in the penetration mode using liquid nitrogen as the coolant and helium as the purge with a force on the penetration probe of 500 mN while being heated from 0° C. to 120° C. at 10° C./min. and held isothermally for 30 minutes. The total penetration of the probe over the entire run was measured and is reported as Δ Height in the following Table 9. The results of this analysis are reported in Table 9 and graphically presented in FIG. 6.

TABLE 9

| EXAMPLE | D | Δ Height | Slope (% penetration/min) |
|---|---|---|---|
| 32 | 35 | 5.594 | 0.038 |
| 36 | 35 | 5.315 | 0.025 |
| 40 | 35 | 5.194 | 0.021 |

Although the invention has been described in detail in the foregoing for the purpose of illustration, it is to be understood that such detail is solely for that purpose and that variations can be made therein by those skilled in the art in without departing from the spirit and scope of the invention except as it may be limited by the claims.

What is claimed is:

1. A RIM process for the production of a rigid, closed-cell polyurethane foam comprising:
   a) intimately mixing (1) an isocyanate-reactive component comprising:
      (i) from 0.5 to 30% by weight, based on total weight of isocyanate-reactive component, of a vegetable oil, fish oil or oil derived from animal fat,
      (ii) from 5 to 80% by weight, based on total weight of isocyanate-reactive component, of an isocyanate-reactive material which is different from (i) having a functionality of at least 1 and a number average molecular weight of from 400 to 10,000,
      (iii) a chain extender or a crosslinking agent,
      (iv) water, and
      (v) a catalyst
      with (2) an organic polyisocyanate in an amount such that the ratio of NCO to OH groups is from 0.8:1 to 1.3:1 and
   b) introducing the mixture from a) into a mold.

2. A RIM process for the production of a rigid, closed-cell polyurethane foam comprising:
   a) intimately mixing the isocyanate-reactive component of claim 1 in which up to 25% by weight of the total isocyanate reactive-component is (i) with an organic polyisocyanate in an amount such that the ratio of NCO to OH groups is from 0.8:1 to 1.3:1 and
   b) introducing the mixture from a) into a mold.

3. A RIM process for the production of a rigid, closed-cell polyurethane foam comprising:
   a) intimately mixing the isocyanate-reactive component of claim 1, in which up to 20% by weight of the total isocyanate-reactive component is (i) with an organic polyisocyanate in an amount such that the ratio of NCO to OH groups is from 0.8:1 to 1.3:1 and
   b) introducing the mixture from a) into a mold.

4. A RIM process for the production of a rigid, closed-cell polyurethane foam comprising:
   a) intimately mixing the isocyanate-reactive component of claim 1 in which (i) is a blown soybean oil with an organic polyisocyanate in an amount such that the ratio of NCO to OH groups is from 0.8:1 to 1.3:1 and
   b) introducing the mixture from a) into a mold.

5. A RIM process for the production of a rigid, closed-cell polyurethane foam comprising:
   a) intimately mixing an isocyanate-reactive component comprising:
      (i) at least 10% by weight, based on total weight of isocyanate-reactive component, of a soybean oil based polyol,
      (ii) from 5 to 80% by weight, based on total weight of isocyanate-reactive component, of a polyether polyol having a functionality of from 2 to 8 and a number average molecular weight of from 400 to 10,000,
      (iii) from 1 to 75% by weight, based on total weight of isocyanate-reactive component, of a chain extender,
      (iv) water, and
      (v) a catalyst
      with an organic polyisocyanate in an amount such that the ratio of NCO to OH groups is from 0.8:1 to 1.3:1 and
   b) introducing the mixture from a) into a mold.

6. A rigid, closed-cell polyurethane foam produced by the process of claim 1.

7. A rigid, closed-cell polyurethane foam produced by the process of claim 2.

8. A rigid, closed-cell polyurethane foam produced by the process of claim 3.

9. A rigid, closed-cell polyurethane foam produced by the process of claim 4.

10. A rigid, closed-cell polyurethane foam produced by the process of claim 5.

* * * * *